May 17, 1949.   C. C. STERRETT   2,470,664
SEALING MEANS

Filed Jan. 25, 1945   2 Sheets-Sheet 1

WITNESSES:

INVENTOR
Charles C. Sterrett.
BY
ATTORNEY

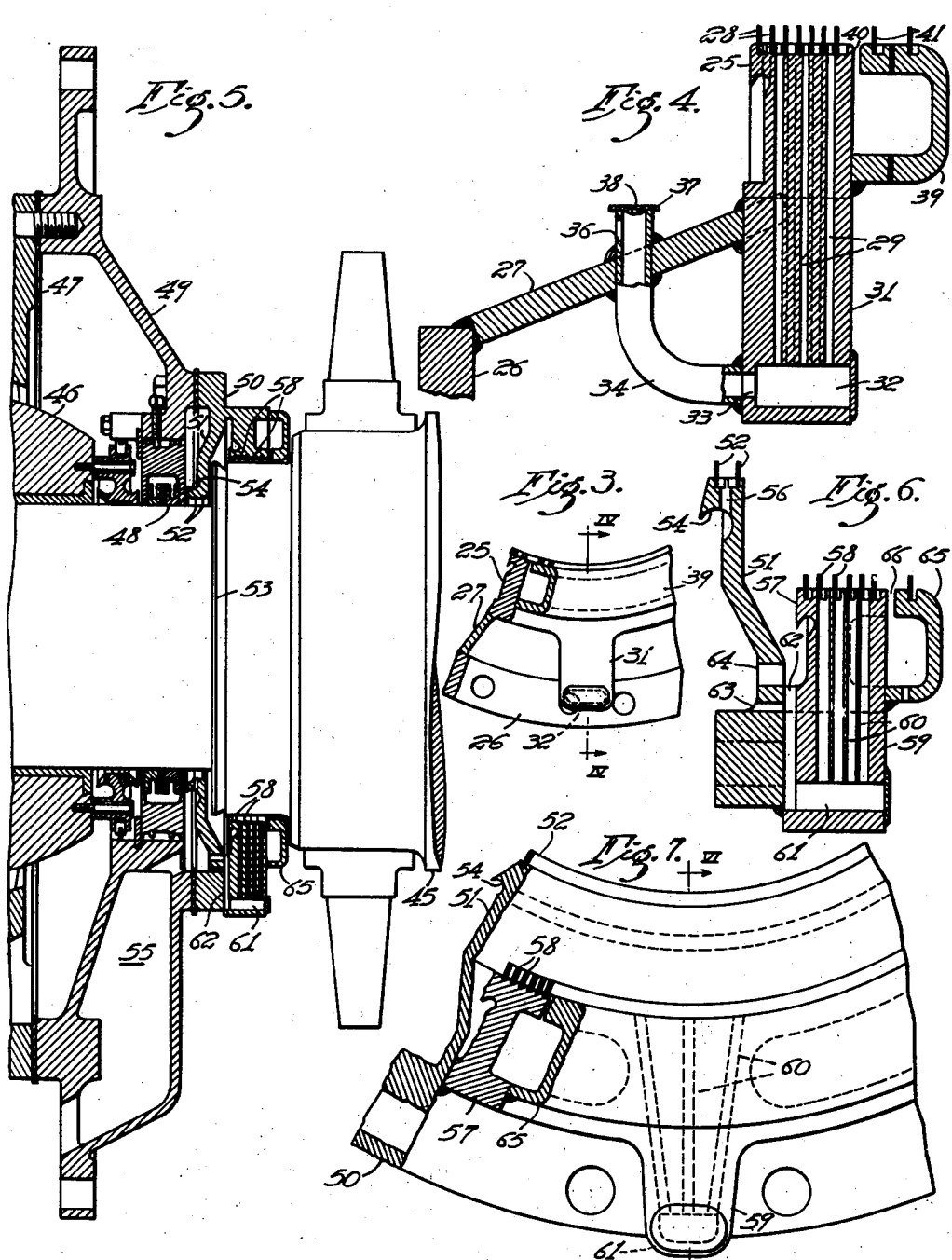

Patented May 17, 1949

2,470,664

UNITED STATES PATENT OFFICE 2,470,664

SEALING MEANS

Charles C. Sterrett, Wilkinsburg, Pa., assignor to Westinghouse Electric Corporation, East Pittsburgh, Pa., a corporation of Pennsylvania Application January 25, 1945, Serial No. 574,547

8 Claims. (Cl. 286—9)

The present invention relates to sealing means of the liquid gland seal type for the rotating shaft of an enclosed gas-filled machine, and it relates more particularly to means for preventing any of the sealing liquid from entering the machine itself.

The sealing means of the present invention is particularly adapted for use in hydrogen-cooled dynamo-electric machines of the type in which the shaft extends through the gas-tight housing of the machine, although its usefulness is not necessarily restricted to this specific application. In hydrogen-cooled machines it is necessary to provide seals at the point or points where the shaft passes through the gas-tight housing in order to prevent the escape of hydrogen from the machine, or the entrance of air along the shaft, and gland seals of the liquid type are usually used for this purpose. In seals of this type a suitable sealing liquid, such as oil, flows through the seal to maintain a film of oil around the shaft in the small clearance between the shaft and stationary sealing rings, or other equivalent members, and it is necessary to prevent this oil from entering the machine after it has flowed through the seal. The oil is, therefore, removed from the shaft after passing through the seal by means of oil catchers and oil throwers, and a labyrinth seal is provided adjacent the gland seal to prevent any of the oil thrown off the shaft, or oil vapor, from entering the machine.

The pressure of the hydrogen or other gas in the machine is not uniform around the shaft when the shaft is rotating and there is a tendency for gas to flow through the labyrinth seal. The oil caught by the labyrinth seal escapes through drain holes in the lower part of the seal, and it has been customary to include a trap in the labyrinth seal to prevent the possibility of gas flowing back through the drain holes, and thus carrying oil into the machine. In order to function, such a trap must, of course, be filled with oil to form a seal, but in the conventional constructions of such labyrinth seals, no special provision has been made for filling the trap with oil, or for keeping it filled. Thus, it has been found that oil is frequently carried into the machine by gas flowing through the trap when the trap is not filled with oil, especially in the case of machines of relatively large size, and when operating with gases heavier than hydrogen, such as carbon dioxide, where the pressure differences around the shaft are relatively high. For this reason it has sometimes been necessary to resort to various expedients to insure filling the trap with oil, such as operating the machine at relatively low speeds for a considerable period of time or even manually filling the trap with oil before starting the machine.

The principal object of the present invention is to provide a liquid gland seal means for rotating shafts in which the sealing liquid is prevented from getting into the machine under all conditions of operation.

Another object of the invention is to provide a sealing means for preventing passage of liquid along a rotatable shaft which includes a labyrinth seal having a trap for liquid caught by the labyrinth to form a seal to prevent air or gas flowing through the drain holes of the labyrinth, and in which provision is made for keeping the trap filled with liquid at all times.

A further object of the invention is to provide a sealing means of the liquid gland seal type in which a labyrinth seal is used to prevent the sealing liquid, or its vapor, from getting into the machine, and in which the labyrinth seal includes a trap and is arranged so as to keep the trap filled with liquid at all times.

A more specific object of the invention is to provide a sealing means of the liquid gland seal type including a labyrinth seal for catching sealing liquid and vapor in which the labyrinth includes a trap which is so arranged that part of the liquid from the gland seal is directed into the trap so as to keep it filled at all times, and in which the trap itself is made deep enough to withstand the pressure difference that may exist on opposite sides of the labyrinth under any condition of operation.

A still further object of the invention is to provide a labyrinth seal for use with a liquid gland seal in which the labyrinth seal includes means for substantially equalizing the gas pressure around the shaft so as to minimize the flow of gas through the labyrinth seal and reduce the pressure differences.

The invention will be more fully understood from the following detailed description, taken in connection with the accompanying drawings, in which:

Fig. 3 is a fragmentary view in elevation showing the lower part of the labyrinth ring;

Fig. 4 is a view in section substantially on the line IV—IV of Fig. 3 and on an enlarged scale;

Fig. 5 is a longitudinal sectional view showing another embodiment of the invention;

Fig. 6 is an enlarged longitudinal sectional view of the lower part of the labyrinth seal of Fig. 5, the section being taken approximately on the line VI—VI of Fig. 7; and Fig. 7 is a fragmentary view in elevation of the lower part of the labyrinth seal of Fig. 5.

Figures 1, 2:
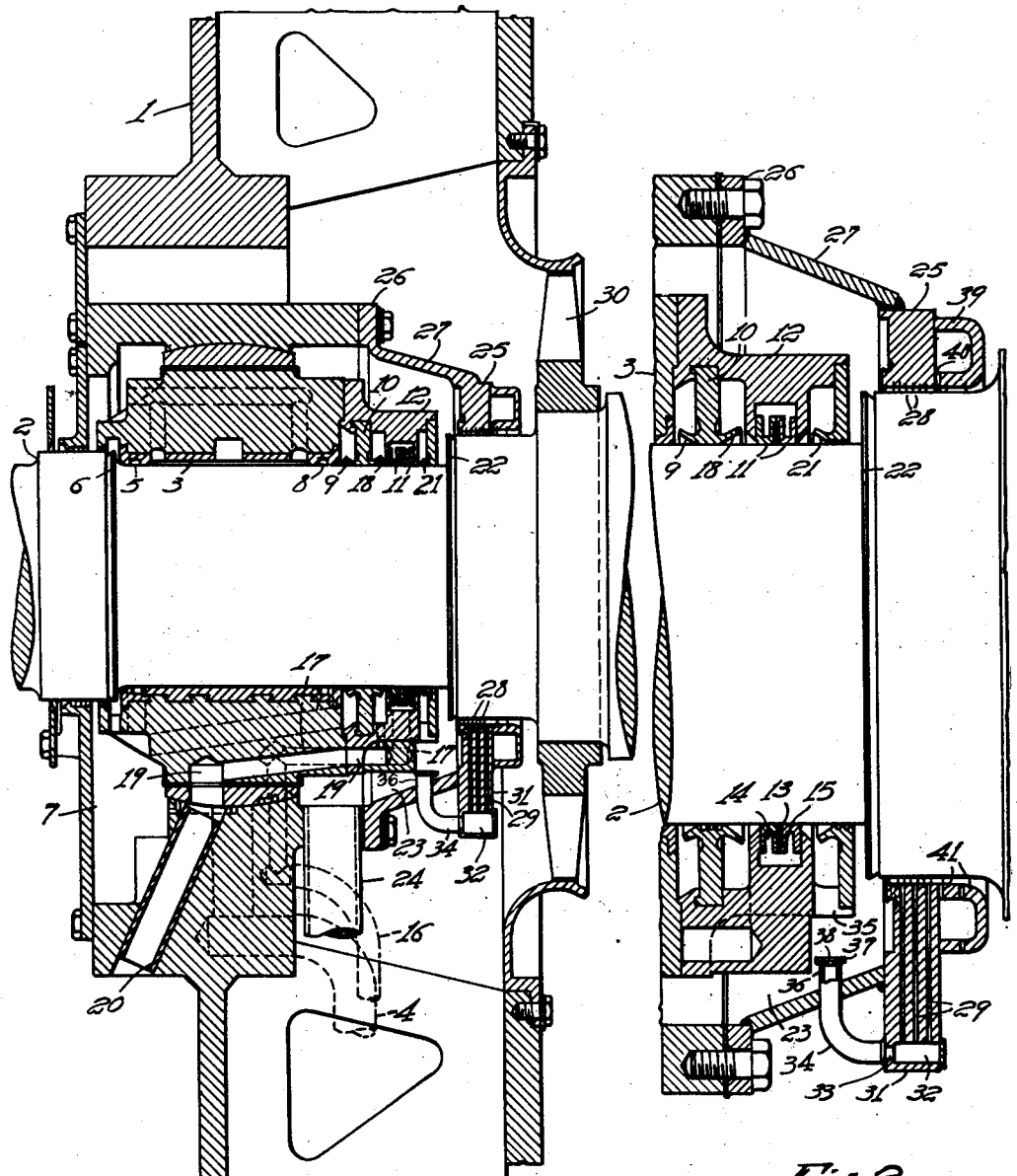
Figure 1 is a longitudinal sectional view of a portion of one end of a hydrogen-cooled dynamo-electric machine, showing the application of the sealing means of the present invention.
Fig. 2 is an enlarged longitudinal sectional view showing the seal.

Fig. 1 shows a portion of the gas-tight housing 1 of a hydrogen-cooled generator having a rotatable shaft 2 which extends through the housing 1. The shaft 2 is supported in a bearing 3 which may be mounted in the housing 1 in any suitable manner. The bearing 3 may be supplied with lubricant in any suitable manner, and for the purpose of illustration the bearing has been shown as supplied with oil through an oil inlet pipe 4, from which the oil passes through suitable ducts to the bearing surface. Oil flowing through the bearing is caught at the left-hand end of the bearing by an oil groove 5, and any oil which escapes from the end of the bearing is thrown off the shaft by an oil thrower shoulder 6. The oil thus removed by the groove 5 and oil thrower 6 drains into a chamber 7 from which it may be removed for recirculation. Oil flowing to the righthand end of the bearing is caught by an oil groove 8, and any oil which escapes from the end of the bearing is thrown off the shaft by its rotation and is caught in a gutter 9 formed on a separator ring 10. The oil caught by the oil groove 8 and gutter 9 is drained into chamber 7 through a suitable duct or ducts. The bearing itself is not a part of the invention, and it is to be understood that any suitable type of bearing may be used, and any desired lubricating system may be provided.

A liquid gland seal is provided adjacent the bearing 3 to prevent the escape of hydrogen from the machine or the entrance of air. The gland seal shown in the drawing is of the type described and claimed in a patent to R. A. Baudry, No. 2,246,912, issued June 24, 1941, and assigned to the Westinghouse Electric & Manufacturing Company. This seal is more clearly shown in Fig. 2 and consists of a pair of non-rotating sealing rings 11 which are supported in a gland seal housing 12 which may be secured to the end of the bearing 3. Each of the sealing rings 11, as more fully described in the above-mentioned patent, has an annular shoulder around its outer circumference, so that when the two rings are placed together, a small annular space 13 is provided between the two rings and extending around the shaft. Each of the rings also has an annular groove 14 formed in it, and a series of holes 15 extending through one wall of the groove 14 and communicating with the annular space 13 between the rings.

A suitable sealing liquid, such as oil, is supplied to the seal through an inlet pipe 16, from which the oil flows through a series of ducts 17, as shown in Fig. 1, to the annular chamber in the gland seal housing 12 in which the rings 11 are supported. The oil flows from this chamber into the annular grooves 14 of the rings 11 and through the holes 15 into the annular space 13 around the shaft, from which it flows in both directions through the small clearance between the rings 11 and the shaft 2. Since the holes 15 are uniformly spaced around the circumference of the shaft, the oil is fed into the space 13 at a plurality of points around the shaft, which results in a uniform flow of oil between the rings and shaft to effectively prevent the flow of hydrogen or air through the seal. Oil flowing from the seal towards the left-hand, or air, side of the seal in Fig. 2 is thrown off the shaft by the rotational effect and is caught in the gutter 18 of the separator ring 10. The oil drains from the gutter 18 to the bottom of the seal and escapes through a series of ducts 19 to a drain pipe 20. Oil flowing from the seal towards the right-hand, or hydrogen, side of the seal, is similarly thrown off the shaft by the rotational effect and caught in a gutter 21 adjacent the seal. A certain amount of the oil, however, will get past the gutter 21, and this oil is thrown off the shaft by an oil thrower shoulder 22 on the shaft. The oil thus removed from the shaft by the oil catcher 21 and oil thrower 22 runs down to a chamber 23 from which it is drained off by a drain pipe 24.

Since the space around the shaft adjacent the shoulder 22 contains oil and oil vapor, a labyrinth seal is provided around the shaft to keep this oil and oil vapor from entering the machine. The labyrinth seal consists of a labyrinth ring 25 encircling the shaft and supported on the bearing support by means of a flange 26 which is connected to the ring 25 by a conical portion 27. The labyrinth ring 25 has a plurality of labyrinth strips 28 encircling the shaft with a very small clearance, and any oil or oil vapor traveling along the shaft is set into rotation by the rotation of the shaft and thrown outward into the chambers between the labyrinth strips. This oil settles to the bottom of the labyrinth chambers and escapes through drain openings 29 at the bottom.

The hydrogen or other gas with which the gas-tight housing 1 is filled is circulated through the machine by means of a fan or blower 30 mounted on the shaft 2. The fan 30 forces the gas into the machine, where it flows through through the heat-producing parts of the machine to withdraw heat from them, and then flows over a cooler or coolers and back to the end of the machine. In one usual arrangement, the coolers, which may be either longitudinal or transverse of the machine, are arranged in the upper part of the housing, and the gas returning to the end of the machine flows down and around the gland seal and back to the fan 30. Because of the high velocity of this gas, and because of the partial admission effect at the entrance to the fan and the rotation of the gas as it enters the fan, the pressure of the gas is not uniform around the shaft, but is higher in the regions above the shaft than in those immediately below the shaft. When the circulating gas is air, the pressure difference between the top of the shaft and the bottom may be as great as two inches of water in large machines at full speed, while with carbon dioxide the pressure difference may be 50% higher than with air.

This pressure difference causes gas to flow through the labyrinth seal through the clearance between the seal and the shaft from the generator side of the labyrinth to the gland seal side at the upper part of the seal, and from the gland seal side to the generator side at the lower part, the pressure in the space around the shaft on the gland seal side of the labyrinth being intermediate between the pressures at the top and bottom on the generator side of the labyrinth. This gas flowing back from the gland seal side to the generator side of the labyrinth, of course, carries oil and oil vapor with it, but this oil is removed by the labyrinth. It is necessary, however, to provide a trap to seal the drainage holes at the bottom of the labyrinth to prevent gas from flowing upward through these holes, and thus carrying oil through the labyrinth seal into the machine. Such traps have sometimes been provided in the conventional designs of labyrinth seals, but no special means have been utilized to see that they are filled with oil. Obviously, if the trap is not filled with oil, there is no seal, and the gas can flow through the drain holes and carry oil into the machine. For this reason, the operation of labyrinth seals of conventional design has not always been satisfactory, and it has usually been necessary to operate the machine at low speed when starting for a sufficiently long time for oil to collect in the trap, or even to fill the trap manually before starting the machine.

When the machine is filled with hydrogen, as in normal operation, the pressure difference from top to bottom of the seal assembly is not as large as the differences mentioned above, so that the problem is not acute. When the machine is operated with air or carbon dioxide, however, considerable difficulty has been encountered with oil leakage into the machine through conventional labyrinth seals because of the large pressure differences mentioned above, and the difficulty of maintaining a proper seal in the labyrinth trap. Operation with carbon dioxide is, of course, not a normal condition, but it occurs when the machine is to be filled with hydrogen, or when hydrogen is being emptied from the machine preparatory to a shutdown. Carbon dioxide is commonly used as a scavenging agent during these operations, and it is sometimes necessary or desirable to run the machine with carbon dioxide for at least a short time, and it is required that no oil shall leak through the labyrinth seal under these conditions. It is also sometimes desired to operate with air cooling and no oil leakage should occur.

The labyrinth seal of the present invention is designed to include a trap which is arranged to be self-filling, so that an adequate amount of oil is contained in the trap at all times to prevent any possibility of gas flow through the drainage openings. In the embodiment of the invention shown in Figs. 1 through 4, the labyrinth ring 25 has a depending portion 31 at the bottom through which the drainage openings 29 from the labyrinth chambers extend. The drainage openings 29 discharge into a chamber 32 at the bottom of the portion 31, and the chamber 32 has an opening 33 at one side which communicates with an overflow pipe 34. The overflow pipe 34 extends upward through the conical portion 27 of the labyrinth seal assembly so as to form a trap with the chamber 32 and drainage passages 29. The depending portion 31 of the labyrinth ring 25 is made relatively deep so that when the overflow pipe 34 is filled with oil, the column of oil in the trap will be long enough to withstand the greatest gas pressure difference that may exist under any conditions of operation.

The overflow pipe 34, as clearly shown in Fig. 2, extends vertically upward through the conical portion 27, and its top is positioned directly under the drainage opening 35 through which the oil caught by the oil catcher 21 drains out. Thus, the pipe 34 is located so that at least a part of the oil which flows out of the gland seal is directed into the pipe 34 to keep the trap filled at all times. The overflow pipe 34 has an overflow opening 36 near its upper end through which oil may escape when the trap is full. The oil overflowing through the opening 36 flows into the chamber 23 and thus into the drain pipe 24. The upper end of the overflow pipe 34 is closed by a dished cover 37 which has a small hole 38 in its center. The cap 37 is used to prevent the relatively high-velocity stream of oil coming from the opening 35 from directly striking the surface of the oil in the pipe 34. If this were permitted, the pressure of the stream of oil flowing into the open end of the pipe might be great enough to back up the oil in the pipe and prevent the trap from filling up. The cap 37 catches the oil running from the opening 35 and breaks up its velocity so that the oil which runs through the hole 38 into the pipe 34 drips in at low velocity, and there is no danger of its backing up the oil in the trap. It is also to be noted that the pipe 34 is positioned so that its vertical portion is substantially perpendicular to the direction of rotation of the gas in the space in which it is located. This prevents the rotating gas from exerting any pressure on the oil in the trap, which might also cause it to back up and prevent the trap from being filled.

As a further means for preventing oil leakage through the seal, there is provided means for substantially equalizing the pressure around the shaft adjacent to the labyrinth seal so as to minimize the flow of gas through the seal. This pressure-equalizing means consists of an equalizing chamber formed by an annular member 39 which is substantially U-shaped in cross section, and which extends around the shaft and is secured to the labyrinth ring 25 at the outer edge of the U-shaped cross section, as shown in Fig. 2. The inner edge of the equalizing chamber 39 does not quite touch the ring 25, so that there is a restricted annular opening 40 extending around the shaft adjacent the labyrinth ring 25. The opening 40 is sufficiently restricted so that the rotation of the shaft has only a relatively small tendency to set the gas within the chamber 39 into rotation, and thus the gas pressure in the equalizing chamber is substantially the same all the way around the shaft. The restricted opening 40 is relatively large, however, as compared to the very small clearance between the labyrinth strips 28 and the shaft, and thus there is little pressure drop through the opening 40, so that the effect of the equalizing chamber is to substantially equalize the gas pressure around the shaft 2 immediately adjacent the labyrinth ring 25, and thus it tends to minimize the flow of gas through the labyrinth seal and the possibility of oil leakage is still further reduced. If desired, labyrinth strips 41 may be placed in the member 39 to provide a small clearance around the shaft adjacent the restricted opening 40.

Figs. 5, 6 and 7 show another embodiment of the invention. Fig 5 shows a portion of the shaft 45 of a hydrogen-cooled dynamoelectric machine with a bearing 46 for the shaft secured in the gas tight housing 47 of the machine. The bearing and its lubricating system may be similar to those shown in Fig. 1, or they may be of any other suitable arrangement. The gland seal 48 is supported adjacent the bearing 46 in a housing 49 and may be of the same type as that described above in connection with Figs 1 and 2. This description need not be repeated here and the oil piping has been omitted from Fig. 5 for the sake of simplifying the drawings, although it is to be understood that oil will be supplied to and drained from the seal 48 in a similar manner to that shown in Fig. 1.

The labyrinth seal assembly 50 of Fig. 5 is secured to the gland seal housing 49 and includes an annular flange 51 encircling the shaft 45 and provided with labyrinth strips 52. The flange 51 is positioned between the gland seal 48 and an oil thrower shoulder 53 on the shaft, and the flange 51 has a gutter 54 formed in it for catching the oil which is thrown off the shaft as it energes from the gland seal 48. The oil flowing through the gutter 54 drains into a chamber 55 from which the oil may be withdrawn in any desired manner, and the oil caught by the labyrinth strips 52 drains through a drainage hole 56 into the chamber 55.

Any oil which gets past the oil catcher 54 and labyrinth strips 52 is thrown off the shaft by the shoulder 53 and drains to the bottom. The labyrinth seal proper 57 consists of an annular ring encircling the shaft with a plurality of labyrinth strips 58 secured in it to form labyrinth chambers which catch the oil and oil vapor in the manner previously described. The labyrinth ring 57 has a downwardly extending portion 59 at the bottom in which drainage holes 60 are formed extending from the various chambers formed by the strips 58 to a chamber 61 at the bottom of the portion 59. Oil draining through the openings 60 into the chamber 61 escapes from the chamber 61 by rising through a vertical duct 62, which forms a trap with the chamber 61 and openings 60 to prevent the flow of gas through the openings 60 when the trap is filled with oil. It will be noted from Fig. 5 that the arrangement is such that the vertical duct or trap 62 is positioned below the shaft so that the oil which is thrown off by the oil thrower 53 runs down and drains into the duct 62, thus keeping it filled with oil at all times. The duct 62 has an overflow opening 63 through which oil escapes when the trap is filled into the chamber 55. An opening 64 is also provided in the flange 51 for the escape of oil draining from the shaft when the duct 62 is completely filled. Most of the oil flowing from the gland seal 48 is caught by the oil catcher 54 and labyrinth strips 52, and the oil which passes the labyrinth 52 and is thrown off by the shoulder 53 may not be enough to fill the trap. If the trap is not filled, however, oil draining from the oil catcher 54 and labyrinth 52 flows into the trap through the opening 63 and thus the trap is kept filled even through the amount of oil reaching the shoulder 53 is insufficient to fill the trap. It is to be noted that the positions of the opening 63 and of the duct 62 are such that they are substantially perpendicular to the direction of rotation of the gas so that there is no danger of the gas pressure causing the oil to back up in the trap and not completely fill it. These openings are not in the direct path of oil draining from the shaft so that the velocity of the oil flowing into the trap is low and it cannot cause the oil to back up in the trap. As in the previous embodiment of the invention, the depending portion 59 is made deep enough for the trap to contain a column of oil which can withstand the greatest gas pressure difference which may occur.

An equalizing chamber 65 is provided on the inner, or generator, side of the labyrinth ring 57. The equalizing chamber 65 is attached to the labyrinth ring and has a restricted opening 66 extending along the shaft closely adjacent to the labyrinth. The structure and functioning of the equalizing chamber 65 are identical with those of the equalizing chamber 39 described above in connection with Figs. 1 to 4, and it operates in the same manner to substantially equalize the pressure around the shaft adjacent the labyrinth, and thus to minimize the flow of gas through the labyrinth seal.

It should now be apparent that in either embodiment of the invention a construction is provided in which a self-filling trap is provided for the labyrinth seal to prevent any possibility of gas flowing back through the drainage openings in the labyrinth and carrying oil into the machine. This result is achieved primarily by arranging the trap in such a manner that a part of the oil from the gland seal is directed into the trap so as to keep it filled at all times, and thus to avoid the danger of the machine being brought up to full speed with the trap insufficiently filled with oil to withstand the pressure differences existing at full speed. The trap is designed to be deep enough to form a seal which will withstand the greatest gas pressure differences that may occur under any conditions of operation, such as when the machine is filled with carbon dioxide when the pressure differences are very much higher than they are with hydrogen. An equalizing chamber is also provided to substantially equalize the pressure around the shaft, and thus to minimize the tendency for the gas to flow through the seal. Thus, relatively simple means are provided for avoiding the difficulties of oil leakage which have been encountered with the conventional labyrinth seal designs which have previously been used. The invention has been specifically described with reference to its use in connection with a gland seal for a hydrogen-cooled dynamoelectric machine, but it will be apparent that its usefulness is not restricted to this particular application, and that the invention is capable of general application for preventing passage of oil or oil vapor along a rotating shaft.

Although certain specific embodiments of the invention have been shown and described for the purpose of illustration, it will be apparent that various other embodiments and modifications are possible, and it is to be understood, therefore, that the invention is not limited to the particular constructional details shown, but in its broadest aspects it includes all equivalent embodiments and modifications which come within the scope of the appended claims.

I claim as my invention:

1. In an enclosed, gas-filled machine having a rotatable shaft, liquid gland seal means for preventing escape of gas along the shaft, means for removing from the shaft sealing liquid flowing from the gland seal, labyrinth seal means encircling the shaft adjacent the gland seal for preventing the entrance of sealing liquid into the machine, and a closed annular equalizing chamber extending around the shaft closely adjacent to the labyrinth seal on the side thereof away from the gland seal, said equalizing chamber having a restricted annular opening therein around the shaft, said annular opening being relatively large as compared to the clearance between the labyrinth seal and the shaft.

2. In an enclosed, gas-filled machine having a rotatable shaft, liquid gland seal means for preventing escape of gas along the shaft, means for removing from the shaft sealing liquid flowing from the gland seal, labyrinth seal means encircling the shaft adjacent the gland seal for preventing the entrance of sealing liquid into the machine, said labyrinth seal means including drainage means for draining off liquid caught by the labyrinth seal means, said drainage means including a trap for sealing the drainage means to prevent flow of gas therethrough, means for directing a part of the sealing liquid removed from the shaft into said trap to keep it filled with liquid, and means adjacent the labyrinth seal means for substantially equalizing the gas pressure around the shaft to minimize the flow of gas through the labyrinth seal.

3. In an enclosed, gas-filled machine having a rotatable shaft, liquid gland seal means for preventing escape of gas along the shaft, means for removing from the shaft sealing liquid flowing from the gland seal, labyrinth seal means encircling the shaft adjacent the gland seal for preventing the entrance of sealing liquid into the machine, said labyrinth seal means including drainage means for draining off liquid caught by the labyrinth seal means, said drainage means including a trap for sealing the drainage means to prevent flow of gas therethrough, means for directing a part of the sealing liquid removed from the shaft into said trap to keep it filled with liquid, and a closed annular equalizing chamber extending around the shaft closely adjacent to the labyrinth seal on the side thereof away from the gland seal, said equalizing chamber having a restricted annular opening therein around the shaft, said annular opening being relatively large as compared to the clearance between the labyrinth seal and the shaft.

4. In an enclosed, gas-filled machine having a rotatable shaft extending through an enclosing housing, liquid gland seal means for preventing the escape of gas along the shaft, means for catching and draining off sealing liquid flowing through said gland seal means, labyrinth seal means adjacent the gland seal means for preventing sealing liquid from entering the machine, said labyrinth seal means including a trap for liquid caught by the labyrinth seal, said trap including an overflow pipe for the escape of liquid therefrom, said overflow pipe being positioned to catch a part of the liquid drained from the gland seal means, whereby the trap is kept filled with liquid.

5. In an enclosed, gas-filled machine having a rotatable shaft extending through an enclosing housing, liquid gland seal means for preventing the escape of gas along the shaft, means for catching and draining off sealing liquid flowing through said gland seal means, labyrinth seal means adjacent the gland seal means for preventing sealing liquid from entering the machine, said labyrinth seal means including a trap for liquid caught by the labyrinth seal, said trap including an overflow pipe for the escape of liquid therefrom, said overflow pipe extending into the path of liquid drained from the gland seal means, and said overflow pipe having an opening therein near its end for the escape of liquid from the trap and having another opening in position to catch a part of the liquid drained from the gland seal means, whereby the trap is kept filled with liquid.

6. In an enclosed, gas-filled machine having a rotatable shaft extending through an enclosing housing, liquid gland seal means for preventing the escape of gas along the shaft, means for catching and draining off sealing liquid flowing through said gland seal means, labyrinth seal means adjacent the gland seal means for preventing sealing liquid from entering the machine, said labyrinth seal means including a trap for liquid caught by the labyrinth seal, said trap including an overflow pipe for the escape of liquid therefrom, said overflow pipe being positioned to catch a part of the liquid drained from the gland seal means, whereby the trap is kept filled with liquid, and an annular equalizing chamber extending around the shaft closely adjacent to the labyrinth seal on the side thereof away from the gland seal, said equalizing chamber having a restricted annular opening therein around the shaft, said annular opening being relatively large as compared to the clearance between the labyrinth seal and the shaft.

7. In an enclosed, gas-filled machine having a rotatable shaft extending through an enclosing housing, liquid gland seal means for preventing the escape of gas along the shaft, means for catching and draining off sealing liquid flowing through said gland seal means, means on the shaft for throwing off sealing liquid flowing along the shaft, labyrinth seal means adjacent liquid throwing means for preventing sealing liquid from entering the machine, said labyrinth seal means including drainage means for draining off liquid caught by the labyrinth seal, said trap having an overflow opening for the escape of liquid therefrom, and having an opening positioned to catch a part of the liquid thrown off the shaft by said liquid throwing means, whereby the trap is kept filled with liquid, and means adjacent the labyrinth seal means for substantially equalizing the gas pressure around the shaft to minimize the flow of gas through the labyrinth seal.

8. In an enclosed, gas-filled machine having a rotatable shaft extending through an enclosing housing, liquid gland seal means for preventing the escape of gas along the shaft, means for catching and draining off sealing liquid flowing through said gland seal means, means on the shaft for throwing off sealing liquid flowing along the shaft, labyrinth seal means adjacent said liquid throwing means for preventing sealing liquid from entering the machine, said labyrinth seal means including drainage means for draining off liquid caught by the labyrinth seal, said drainage means including a trap for sealing the drainage means to prevent flow of gas therethrough, said trap having an overflow opening for the escape of liquid therefrom, and having an opening positioned to catch a part of the liquid thrown off the shaft by said liquid throwing means, whereby the trap is kept filled with liquid, and a closed annular equalizing chamber extending around the shaft closely adjacent to the labyrinth seal on the side thereof away from the gland seal, said equalizing chamber having a restricted annular opening therein around the shaft, said annular opening being relatively large as compared to the clearance between the labyrinth seal and the shaft.

CHARLES C. STERRETT.

REFERENCES CITED

The following references are of record in the file of this patent:

UNITED STATES PATENTS

| Number | Name | Date |
| --- | --- | --- |
| 1,840,127 | Penney | Jan. 5, 1932 |
| 2,159,057 | Sterrett | May 23, 1939 |
| 2,246,912 | Baudry | June 24, 1941 |